United States Patent
Surnilla et al.

(10) Patent No.: US 10,760,520 B2
(45) Date of Patent: *Sep. 1, 2020

(54) METHOD FOR FUEL INJECTION CONTROL (71) Applicant: Ford Global Technologies, LLC, Dearborn, MI (US)

(72) Inventors: Gopichandra Surnilla, West Bloomfield, MI (US); Eric Krengel, Moreland Hills, OH (US); Joseph Lyle Thomas, Kimball, MI (US); Todd Anthony Rumpsa, Saline, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 697 days.

This patent is subject to a terminal disclaimer.

(21) Appl. No.: 15/238,496

(22) Filed: Aug. 16, 2016

(65) Prior Publication Data
US 2016/0356236 A1    Dec. 8, 2016

Related U.S. Application Data

(62) Division of application No. 14/189,900, filed on Feb. 25, 2014, now Pat. No. 9,435,287.

(51) Int. Cl.
*F02D 41/30* (2006.01)
*F02D 19/06* (2006.01)
(Continued)

(52) U.S. Cl.
CPC ..... *F02D 41/3094* (2013.01); *F02D 13/0207* (2013.01); *F02D 13/0219* (2013.01);
(Continued)

(58) Field of Classification Search
CPC ............ F02D 41/3094; F02D 41/3005; F02D 41/047; F02D 41/008; F02D 41/065;
(Continued)

(56) References Cited

U.S. PATENT DOCUMENTS 6,725,650 B2 *   4/2004   Nishimura .......... F02D 41/3064
                                                        60/276
6,990,968 B2 *   1/2006   Nagaishi ............... F02D 41/047
                                                       123/480

(Continued)

FOREIGN PATENT DOCUMENTS

CA     2809298 A1   5/2013
CN   101142390 A    3/2008
(Continued)

OTHER PUBLICATIONS

Machine Translation, JP2006348867A, Kojima et al., Detailed Description, Dec. 28, 2006, obtained from https:// worldwide. espacenet.com/, pp. 1-48. (Year: 2006).*

(Continued)

*Primary Examiner* — Grant Moubry
(74) *Attorney, Agent, or Firm* — Geoffrey Brumbaugh; McCoy Russell LLP (57) ABSTRACT

Methods and systems are described for controlling fuel injection in an engine equipped with a dual injector system including a port injector and a direct injector. A ratio of port injected fuel to direct injected fuel is adjusted based at least on intake valve temperature. The proportion of fuel port injected into a cylinder is increased as the intake valve temperature for the given cylinder increases to improve fuel vaporization in the intake port.

13 Claims, 5 Drawing Sheets (51) Int. Cl.
*F02D 41/00* (2006.01)
*F02M 69/30* (2006.01)
*F02D 41/04* (2006.01)
*F02D 41/06* (2006.01)
*F02D 13/02* (2006.01)
*F02D 19/08* (2006.01)
*F02M 45/00* (2006.01)

(52) U.S. Cl.
CPC ....... *F02D 13/0261* (2013.01); *F02D 19/084* (2013.01); *F02D 19/088* (2013.01); *F02D 41/008* (2013.01); *F02D 41/0025* (2013.01); *F02D 41/047* (2013.01); *F02D 41/064* (2013.01); *F02D 41/065* (2013.01); *F02D 41/3005* (2013.01); *F02M 69/30* (2013.01); *F02D 41/0007* (2013.01); *F02D 2041/001* (2013.01); *F02D 2200/021* (2013.01); *F02D 2200/04* (2013.01); *F02D 2200/101* (2013.01); *F02D 2200/1002* (2013.01); *F02M 45/00* (2013.01); *Y02T 10/18* (2013.01); *Y02T 10/36* (2013.01)

(58) Field of Classification Search
CPC ............... F02D 41/064; F02D 41/0025; F02D 41/0007; F02D 19/084; F02D 19/088; F02D 13/0219; F02D 13/0207; F02D 13/0261; F02D 2200/1002; F02D 2200/101; F02D 2200/04; F02D 2200/021; F02D 2041/001; F02M 45/00; Y02T 10/18; Y02T 10/36
See application file for complete search history.

(56) References Cited

U.S. PATENT DOCUMENTS

| | | | |
|---|---|---|---|
| 7,082,926 B2 | 8/2006 | Sadakane et al. | |
| 7,198,031 B2 | 4/2007 | Saito et al. | |
| 7,216,627 B2 | 5/2007 | Ito et al. | |
| 7,269,941 B2* | 9/2007 | Ichise | F02D 41/0235 123/295 |
| 7,270,112 B2 | 9/2007 | Kinose | |
| 7,314,036 B2 | 1/2008 | Altenschmidt | |
| 7,412,821 B2 | 8/2008 | Araki et al. | |
| 7,415,348 B1 | 8/2008 | Ramappan et al. | |
| 7,549,408 B2 | 6/2009 | Russell | |
| 7,594,498 B2 | 9/2009 | Lewis et al. | |
| 7,599,787 B2 | 10/2009 | Hokuto et al. | |
| 7,694,507 B2 | 4/2010 | Tokuda | |
| 7,712,451 B2 | 5/2010 | Hung et al. | |
| 7,765,982 B2 | 8/2010 | Lewis et al. | |
| 7,769,527 B2 | 8/2010 | Noda et al. | |
| 7,789,063 B2 | 9/2010 | Lewis et al. | |
| 7,849,842 B1 | 12/2010 | Lewis et al. | |
| 7,894,973 B2 | 2/2011 | Mallebrein et al. | |
| 8,037,874 B2 | 10/2011 | Glugla | |
| 8,100,107 B2 | 1/2012 | Bidner et al. | |
| 8,297,255 B2 | 10/2012 | Bidner et al. | |
| 8,567,370 B2 | 10/2013 | Bidner et al. | |
| 9,255,541 B2 | 2/2016 | Sumilla et al. | |
| 9,297,329 B2 | 3/2016 | Sumilla et al. | |
| 9,303,577 B2 | 4/2016 | Sumilla et al. | |
| 9,777,646 B2* | 10/2017 | Bidner | F02D 19/0642 |
| 2006/0096575 A1 | 5/2006 | Araki et al. | |
| 2007/0068485 A1 | 3/2007 | Hilditch | |
| 2007/0119413 A1* | 5/2007 | Lewis | F02D 41/0025 123/295 |
| 2007/0119414 A1 | 5/2007 | Leone et al. | |
| 2007/0215110 A1 | 9/2007 | Stein et al. | |
| 2008/0283004 A1 | 11/2008 | Lewis et al. | |
| 2009/0000595 A1* | 1/2009 | Ashizawa | F02D 35/025 123/435 |
| 2009/0099756 A1 | 4/2009 | Demura | |
| 2009/0229570 A1* | 9/2009 | Ulrey | F02D 41/20 123/431 |
| 2009/0319154 A1 | 12/2009 | Mallebrein et al. | |
| 2011/0162620 A1 | 7/2011 | Bidner et al. | |
| 2014/0172275 A1 | 6/2014 | Sumilla et al. | |
| 2014/0297162 A1 | 10/2014 | Sumilla et al. | |

FOREIGN PATENT DOCUMENTS

| | | |
|---|---|---|
| EP | 1881192 A1 | 1/2008 |
| EP | 1859142 B1 | 4/2009 |
| EP | 2256321 A2 | 12/2010 |
| JP | 2005330833 A | 12/2005 |
| JP | 2006348867 A | 12/2006 |
| JP | 2007032501 A | 2/2007 |
| JP | 2007192108 A | 8/2007 |
| JP | 2007278137 A | 10/2007 |
| JP | 2009197705 A | 9/2009 |
| JP | 2010043588 A | 2/2010 |
| WO | 2006079172 A1 | 8/2006 |
| WO | 2012028944 A1 | 3/2012 |
| WO | 2013075234 A1 | 5/2013 |

OTHER PUBLICATIONS

State Intellectual Property Office of the People's Republic of China, Office Action and Search Report Issued in Application No. 201510083481.1, dated Nov. 5, 2018, 12 pages (Submitted with Partial Translation).

State Intellectual Property Office of the People's Republic of China, Office Action and Search Report Issued in Application No. 201510083481.1, dated Apr. 17, 2019, 12 pages. (Submitted with Partial Translation).

* cited by examiner

METHOD FOR FUEL INJECTION CONTROL

CROSS REFERENCE TO RELATED APPLICATIONS

The present application is a divisional of U.S. patent application Ser. No. 14/189,900, entitled "METHOD FOR FUEL INJECTION CONTROL," filed on Feb. 25, 2014, the entire contents of which are incorporated herein by reference for all purposes.

TECHNICAL FIELD

The present application relates to methods and systems for controlling fuel injection in an engine system configured with both port and direct fuel injection.

BACKGROUND AND SUMMARY

Engines may be configured with direct fuel injectors that inject fuel directly into a combustion cylinder (direct injection), and/or with port fuel injectors that inject fuel into a cylinder intake port (port fuel injection). Direct injection (DI) offers higher fuel efficiency and higher power output in addition to enabling a charge cooling effect of the injected fuel. However, direct injected engines usually have higher particulate matter emissions (or soot) due to diffuse flame propagation wherein fuel may not adequately mix with air prior to combustion. Port fuel injection usually (PFI) provides cleaner emissions and high performance under low loads, due to improved mixing. In engine systems configured with each of a port injector and a direct injector coupled to each engine cylinder, a ratio of fuel(s) delivered to a given cylinder via port injection and direct injection can be varied.

One example approach is shown by Bidner et al in U.S. Pat. No. 8,100,107. Therein, a split ratio of fuel injection is adjusted to reduce particulate matter (PM) emissions. Specifically, during selected operating conditions, such as at higher engine speeds and loads, a smaller proportion of port fuel injection and a larger proportion of direct fuel injection is used to take advantage of the higher power output of the more precise direct injection as well as the charge cooling properties of the direct injected fuel. In comparison, at lower engine speeds and loads, a higher proportion of port injection may be used.

However, the inventors herein have identified potential issues with such an approach. The benefits associated with port fuel injection can be a function of the intake valve temperature. Specifically, port fuel injection is used to improve fuel economy benefits due to increased manifold pressure, which arises from fuel evaporated in the cylinder's intake port by absorbing heat from the intake valves. The evaporation of the port injected fuel atomizes the fuel very well, thereby reducing particulate matter emissions. However, there may be conditions at low engine speed-load operating regions where the intake valve temperature is not sufficiently warm. In addition, there may be significant cylinder-to-cylinder variation in intake valve temperature. If a higher proportion of port injection is scheduled for a cylinder where the intake valve is not sufficiently warm, particulate matter emissions may actually be increased. As a result, even with the shift towards more port injection, particulate matter (PM) emissions may not be sufficiently reduced to meet the mandated low PM emission standards. In addition, due to inefficient fuel vaporization, engine performance may be degraded.

In one example, some of the above issues may be addressed by a method for an engine comprising adjusting a ratio of fuel delivered to a cylinder via direct injection relative to port injection based on a temperature of an intake valve of the cylinder. In this way, port injection may be enabled during conditions when port injection benefits can be applied.

As an example, an engine system may be configured with each of a port injector and a direct injector coupled to each engine cylinder. In some embodiments, the port injector may deliver a fuel of a different composition and alcohol content than the fuel delivered via the direct injector. An engine controller may be configured to generate an initial fuel injection profile for all engine cylinders based on operating conditions such as engine speed, combustion event number, exhaust catalyst temperature (e.g., if it is a hot start or a cold start), etc. For example, during an engine cold start, for a first number of combustion events since the engine start, the initial fuel injection profile may include a higher proportion of fuel delivered via direct injection relative to port injection. As such, the initial fuel injection profile may be common to all engine cylinders.

The engine controller may then modify the initial fuel injection for each engine cylinder based on individual cylinder intake valve temperatures. For example, the proportion of fuel delivered via port injection may be increased as the intake valve temperature increases (e.g., exceeds a threshold) to increase the benefits of port injection. In addition, a timing of port injecting fuel may be moved closer towards intake valve opening as the temperature increases. The proportion may also be adjusted based on the fuel being port injected to increase vaporization of the fuel. As a result of the cylinder-specific fuel injection profile customization, there may be cylinders having a lower intake valve temperature operating with a relatively smaller amount of port fuel injection and other cylinders having a higher intake valve temperature operating with a relatively larger amount of port fuel injection. Once a threshold engine speed is attained (e.g., idling speed), all engine cylinders may be transitioned to an idling fuel injection profile.

In this way, the scheduling of a port injector may be adjusted based on the intake valve temperature of a cylinder to improve the port injection benefits. By increasing the fraction of fuel delivered via the port injector as the intake valve temperature increases, the amount of fuel evaporated and homogenized in the intake port is increased. In addition, the time taken to vaporize the fuel is reduced, allowing for adjusting of valve timing. By biasing towards port injection during conditions when port injected fuel can be efficiently vaporized, particulate matter emissions are reduced. In addition, engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
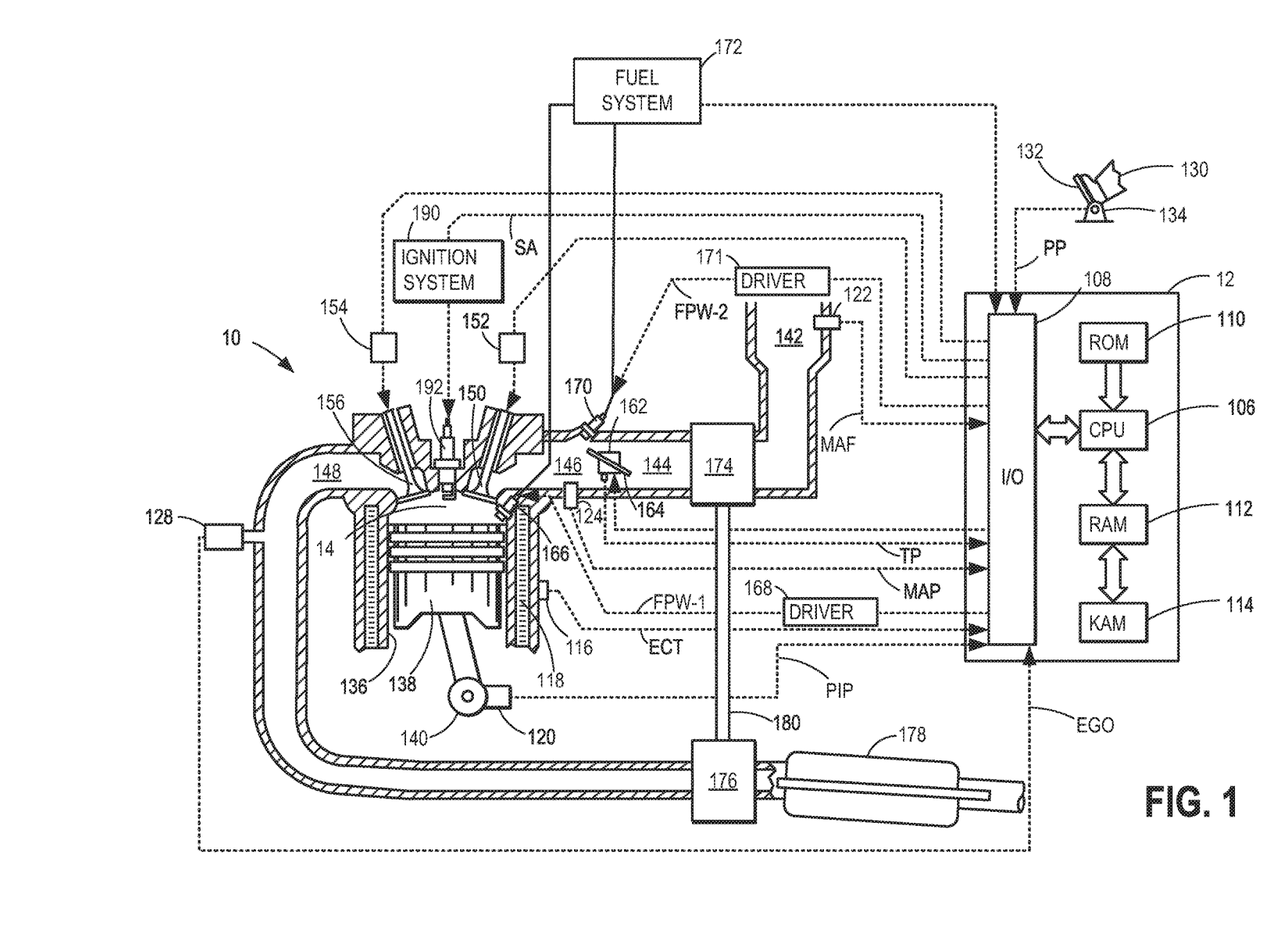
FIG. 1 depicts an example combustion chamber.

The following description relates to systems and methods for adjusting an engine fuel injection schedule, such as in the engine system of FIG. 1. An engine controller may adjust a fuel injection schedule, including an amount of fuel direct injected relative to an amount of fuel port injected into an engine cylinder, based on engine operating conditions including an intake valve temperature, as shown in the example routine of FIG. 2. As elaborated with reference to FIGS. 2-5, the adjustment may be based on combustion event number, exhaust catalyst temperature (e.g., hot start or cold start conditions), as well as intake valve temperature. For example, as intake valve temperature crosses a threshold, more fuel may be injected via port injection. By transitioning the fuel injection from a relatively higher amount of direct injection to a relatively higher amount of port injection as the intake valve temperature increases, as shown in FIG. 6, exhaust emissions may be controlled.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (that is, combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may be alternatively provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

In the depicted embodiment, fuel injectors 166 and 170 are both supplied fuel by a common fuel system 172. However, in alternate embodiments, such as where port injector 170 may deliver fuel of a different composition or alcohol content than fuel delivered by direct injector 166, the two injectors may be coupled to separate fuel systems including respective fuel tanks.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine speed and/or intake valve temperature, as described herein. The relative distribution of the total injected fuel among injectors 166 and 170 may be referred to as an injection ratio. For example, injecting a larger amount of the fuel for a combustion event via (port) injector 170 may be an example of a higher ratio of port to direct injection, while injecting a larger amount of the fuel for a combustion event via (direct) injector 166 may be a lower ratio of port to direct injection. Note that these are merely examples of different injection ratios, and various other injection ratios may be used.

Likewise, the delivery of fuel for each combustion event may be according to a fuel injection profile which may include total fuel injection amount(s), number of injections, injection ratios, injection timings, etc.

Additionally, it should be appreciated that port injected fuel may be delivered during an open intake valve event, closed intake valve event (e.g., substantially before an intake stroke, such as during an exhaust stroke), as well as during both open and closed intake valve operation. Similarly, direct injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke, or a combination of some direct injections during the compression stroke and some during the intake stroke.

As such, even for a single combustion event, fuel may be injected at different timings for a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tank in fuel system 172 may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc.

Moreover, fuel characteristics of the fuel tank may vary frequently. In one example, a driver may refill fuel system 172 with E85 one day, and E10 the next, and E50 the next. The day to day variations in tank refilling can thus result in frequently varying fuel compositions of fuel in fuel system 172, thereby affecting the injection profile of fuel delivered by injectors 166 and 170.

Figure 2:
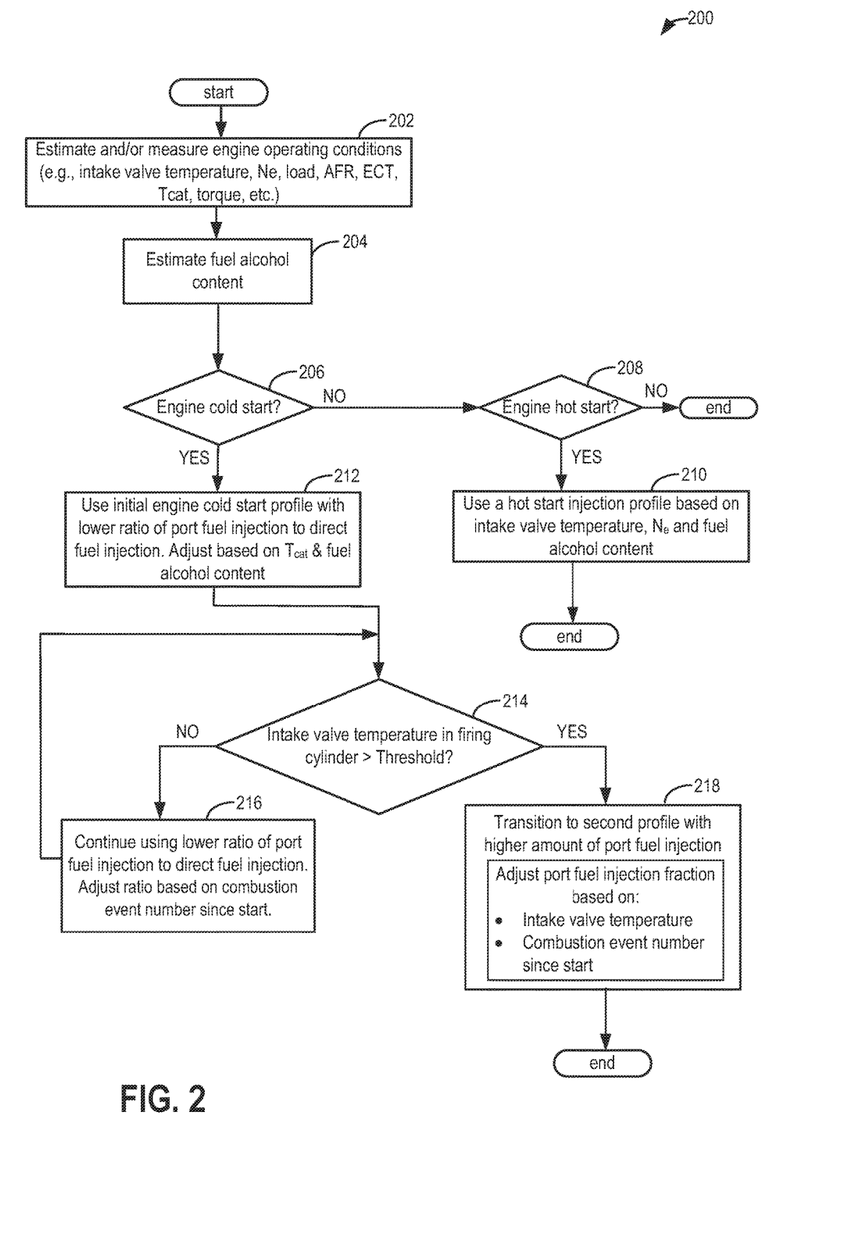
FIG. 2 shows a high level flow chart for adjusting fuel injection ratio during an engine start.

As elaborated with reference to FIG. 2, a controller may adjust a fuel injection profile during a first cylinder combustion event based on whether the engine start is a hot start or a cold start. The fuel injection ratio may be adjusted to take advantage of the evaporative effects of a hot intake valve on fuel injected via a port injector during a hot engine start. If the engine start is cold, the ratio may be adjusted to improve emissions during a cold start, such as delivering a larger proportion of direct injected fuel during a compression stroke for an initial number of combustion events. A first injection profile may be used at a cold engine start with a predetermined injection ratio that is based on exhaust catalyst temperature, and alcohol content of the fuel where the selected ratio may enable expedited heating of the exhaust catalyst. The first injection profile may be continued into engine crank until a threshold intake valve temperature is exceeded. Then, fuel injection may be transitioned to a second, different injection profile, having a different injection ratio that takes advantage of port injection benefits.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Now turning to FIG. 2, an example routine 200 is shown for controlling fuel injection to an engine cylinder including a (first) port injector and a (second) direct injector during an engine start based on engine start conditions.

At 202, engine operating conditions may be estimated and/or measured. These may include, for example, engine speed (Ne), engine load, cylinder air-to-injected fuel ratio (AFR), engine temperature (for example, as inferred from an engine coolant temperature), exhaust catalyst temperature (Tcat), intake valve temperature of each cylinder, desired torque, etc. Intake valve temperature (IVT) of a specific cylinder may be inferred based on one or more of cylinder load, coolant temperature, and location of the specific cylinder in the engine block. For example, in an engine comprising four cylinders arranged in an inline manner, the two outer cylinders may be cooler while the two inner cylinders may be hotter. In another example, wherein the engine comprises an integrated exhaust manifold, the intake valve temperatures of each cylinder may be dependent on the location of a coolant loop relative to the cylinder heads. Herein, the intake valves of cylinders closer to the coolant loop may be warmer than those of cylinders further from the coolant loop.

At 204, an alcohol content of the injected fuel may be estimated and/or determined. In one example, the alcohol content of the fuel in the fuel tank may be estimated after each tank refueling event. The estimation may be based on one or more empirical methods and further based on inputs from the vehicle operator. In embodiments where the port injector is configured to inject a first fuel (with a first alcohol content) and the direct injector is configured to inject a second fuel (with a second, different alcohol content), the routine includes estimating the alcohol content of each of the port injected and direct injected fuel.

At 206, it may be determined whether an engine cold-start condition is present. As such, an engine cold-start may include an initial engine start from shutdown conditions. In one example, an engine cold-start condition may be confirmed if an engine temperature is below a threshold and a catalyst temperature is below a threshold (such as below a light-off temperature). As such, during the engine cold start, an intake valve temperature of substantially all the engine cylinders may be below a threshold.

In response to an engine cold-start condition, at 212, the routine includes operating the engine with a first, initial cold start fuel injection profile to expedite catalyst activation. Operating with the first cold start injection profile includes, during a first combustion event since engine start, and a number of combustion events since the engine start, providing a higher proportion of direct injected fuel relative to port injected fuel. In addition, more of the direct injected fuel may be delivered as a compression stroke injection as compared to an intake stroke injection. Herein, direct injection of fuel during a compression stroke may be advantageously used to improve fuel vaporization and heat the engine and catalyst, thereby improving engine and catalyst performance under engine start conditions.

The first cold start fuel injection profile may also include a first fuel ratio (a ratio of the port injection amount relative to a direct injection amount) that is adjusted based on the estimated alcohol content of the fuel. For example, as the alcohol content of the fuel increases, the proportion of fuel that is port injected may be decreased further and the proportion of direct injected fuel may be correspondingly increased. As an example, when the injected fuel is E10 (having a lower alcohol content), the first ratio may include 35% port injection:65% direct injection. In comparison, when the injected fuel is E85 (having a higher alcohol content), the first ratio may include 10% port injection:90% direct injection.

The first cold start injection profile and cold start ratio may be further adjusted based on an exhaust catalyst temperature. For example, as a difference between the catalyst temperature and a threshold temperature (e.g., light-off temperature) at the cold-start increases (that is, the catalyst is colder), relatively less port injection may be used. For example, as the catalyst temperature increases, and further after the intake valve temperature of a given cylinder has increased above a threshold, the proportion of port injected fuel may be increased incrementally.

Fuel injection with the first injection profile may be continued for a number of combustion events since the engine start. At 214, the intake valve temperature for each cylinder may be reassessed and it may be determined whether the intake valve temperature (IVT) within the next cylinder to fire is higher than a threshold. The threshold may be calibrated based on of engine performance both emissions and stability. The threshold may be further based on the alcohol content of the injected fuel (e.g., the port injected fuel). Thus, as the alcohol content of the injected fuel increases, the threshold may be increased. For example, when operating the engine with low alcohol content fuel, such as an ethanol blend containing 10% ethanol, the threshold may be lower and a shift in injection profile towards a higher proportion of port fuel injection may be performed at a lower intake valve temperature. In comparison, when operating the engine with a fuel containing a higher alcohol content, such as an ethanol blend containing 85% ethanol, the threshold may be higher and the shift in injection profile towards the higher proportion of port fuel injection may be performed at a higher intake valve temperature. By adjusting the threshold based on fuel alcohol content, the fuel injection profile may take into account the higher heat of vaporization of ethanol fuels.

As such, in embodiments where a first fuel is delivered to the cylinder via port injection and a second fuel is delivered to the cylinder via direct injection, the fuel injection ratio may be adjusted based on an alcohol content of the port injected fuel.

As such, before each cylinder combustion event, the intake valve temperature (IVT) of the cylinder that will be firing may be assessed. If the IVT for the next cylinder to fire is determined to be below the threshold, at 216, the first cold start injection profile with a lower proportion of port injected fuel to direct injected fuel may be continued with the injection ratio adjusted based on the combustion event number since start. In one example, as the number of combustion events since the engine start increases, the fuel injection ratio (between direct injected and port injected fuel) may be maintained while a gradually increasing proportion of the direct injected fuel may be delivered in the intake stroke relative to the compression stroke. For example, the fuel injection ratio may include 35:30:35 intake stroke DI:compression stroke DI:PFI. In another example, as the combustion event number since the engine start increases, the cold start injection profile may be adjusted to provide a higher proportion of port injected fuel relative to direct injected fuel. However, the increase in port injected fuel responsive to the increase in combustion event number may be smaller than a corresponding increase in port injected fuel when the IVT increases above the threshold. As such, whenever the injection profile includes an increase in the amount of port injected fuel, an amount of direct injected fuel may be correspondingly decreased to maintain the overall fuel injection amount.

If IVT is determined to be above the threshold within a specific cylinder, at 218, the controller may transition the fuel injection in the given engine cylinder to a second injection profile having a different injection ratio. Operating the engine with the second injection profile includes providing a higher proportion of port injected fuel relative to that provided during the first injection profile. The increase in port injection amount may be based at least on the IVT as well as the cylinder combustion event number. As such, the amount of direct injected fuel may be reduced relative to the amount provided during the first injection profile as the port injection amount increases.

FIG. 6 demonstrates an example variation of port injection fuel fraction relative to direct injection fuel fraction as IVT increases within a given engine cylinder. Map 600 shows intake valve temperature plotted along the x-axis and an amount of injected fuel along the y-axis. Plot 602 represents a quantity of fuel injected via a port injector and plot 604 represents a quantity of direct injected fuel. Line 603 represents a cold start. At a cold start, when IVT in the given cylinder is lower and below a threshold, the proportion of direct injected fuel (plot 604) is significantly higher than that of port injected fuel (plot 602). But as IVT for the given cylinder increases, the proportion of port injected fuel may be increased with a corresponding decrease in direct injected fuel. By using a higher ratio of port injection as intake valve temperature increases, fuel may be evaporated and atomized in the cylinder's intake port by absorbing heat from the intake valves. Engine performance may be enhanced with an improved fuel economy and reduced particulate matter emissions.

Returning to routine 200, at 218, the fuel injection ratio within a given cylinder may be continually adjusted based on the IVT. For example, at each cylinder combustion event, the IVT may be reassessed and as it increases past the threshold, a higher proportion of port injected fuel may be enabled for that cylinder combustion event. Specifically, the proportion of port injected fuel may increase as the IVT increases over an engine cycle. In one example, when IVT is at or just above the threshold, the proportion of port injected fuel may be 20% of the total amount of fuel injected. As the IVT increases, the proportion of port injected fuel may be further increased to 100%. This may include, gradually increasing the duty cycle of the port injector, while gradually decreasing the duty cycle of the direct injectors. However, the increase in amounts of port injected fuel may be restricted, particularly at high speeds, when the advantages of direct injection outweigh the benefits of port injection. As such, the IVT for a given cylinder may be estimated at the start of every combustion event and the injection ratio may be further adjusted.

In addition to increasing the proportion of fuel injected via a port injector in a given cylinder, a timing of port injection can be retarded towards an intake valve opening. For example, when a first injection profile is used during a cold start, a small portion of fuel may be injected via a port injector at 60 degrees before the piston reaches top dead center (TDC) position of the exhaust stroke. As IVT increases above the threshold within that same cylinder and a transition is made to the second injection profile, a larger proportion of fuel may be injected via the port injector at 30 degrees before the piston reaches TDC position of the exhaust stroke.

It will be appreciated that the increase in port injection ratio of the cold start injection profile (at 218) is based on each of the IVT and the combustion event number. Thus, a higher proportion of port injected fuel relative to direct injected fuel may be delivered as the IVT increases and as a number of combustion events since engine start elapse until the threshold temperature is reached. Thereafter, the increase in port injected fuel may be based on the combustion event number since the engine start. As such, after a threshold number of combustion events since engine start have elapsed, the engine may transition from the cold start fuel injection profile to an engine idling fuel injection profile.

Returning now to 206, if an engine cold-start condition is not determined, at 208, an engine hot-start condition may be confirmed. As such, the engine hot-start may include an engine restart wherein the engine is restarted soon after a preceding engine shut-down. In one example, an engine hot-start condition may be confirmed if an engine temperature and/or a catalyst temperature is above a threshold. If a hot start is not confirmed, routine 200 ends.

If at 208 a hot start is confirmed, routine 200 may operate the engine with a hot start injection profile which may be determined based on engine speed and fuel alcohol content, and further based on intake valve temperature for each firing cylinder. The profile may include a higher proportion of port injected fuel relative to the cold start profile to take advantage of the intake valve being hot enough to evaporate fuel injected into the intake port. This injection ratio may be utilized particularly at low engine speeds when port injection provides better performance and lower emissions. As engine speed increases, the amount of fuel injected through the port injector may be decreased. Further, the amount of fuel injected through the direct injector may be increased to provide higher power output and fuel efficiency. Additionally, direct injection of fuel may be used to take advantage of its charge cooling properties.

In this way, a controller can execute routine 200 to adjust a fuel injection ratio during an engine start. A first injection ratio during cold starts may be based on engine speed, combustion event number and fuel alcohol content. Herein, the fraction of fuel delivered via port fuel injection may further depend on intake valve temperature. At cold engine temperatures, the proportion of fuel delivered via port injection may be lower relative to that provided by direct fuel injection, to improve emissions. Injecting a smaller fraction of port injected fuel when the intake valve is cool may also reduce fuel puddling in the intake port. As IVT for a cylinder at each combustion event rises past a threshold, the injection profile may be biased towards delivering a higher proportion of fuel via port injection into the intake port where it may be evaporated by absorbing heat from the intake valve. However, at higher engine speeds and loads, a larger proportion of direct fuel injection may be used to provide higher power output. The injection profile may be further modified based on fuel alcohol content to account for different heats of vaporization and fuel boiling points.

Figure 3:
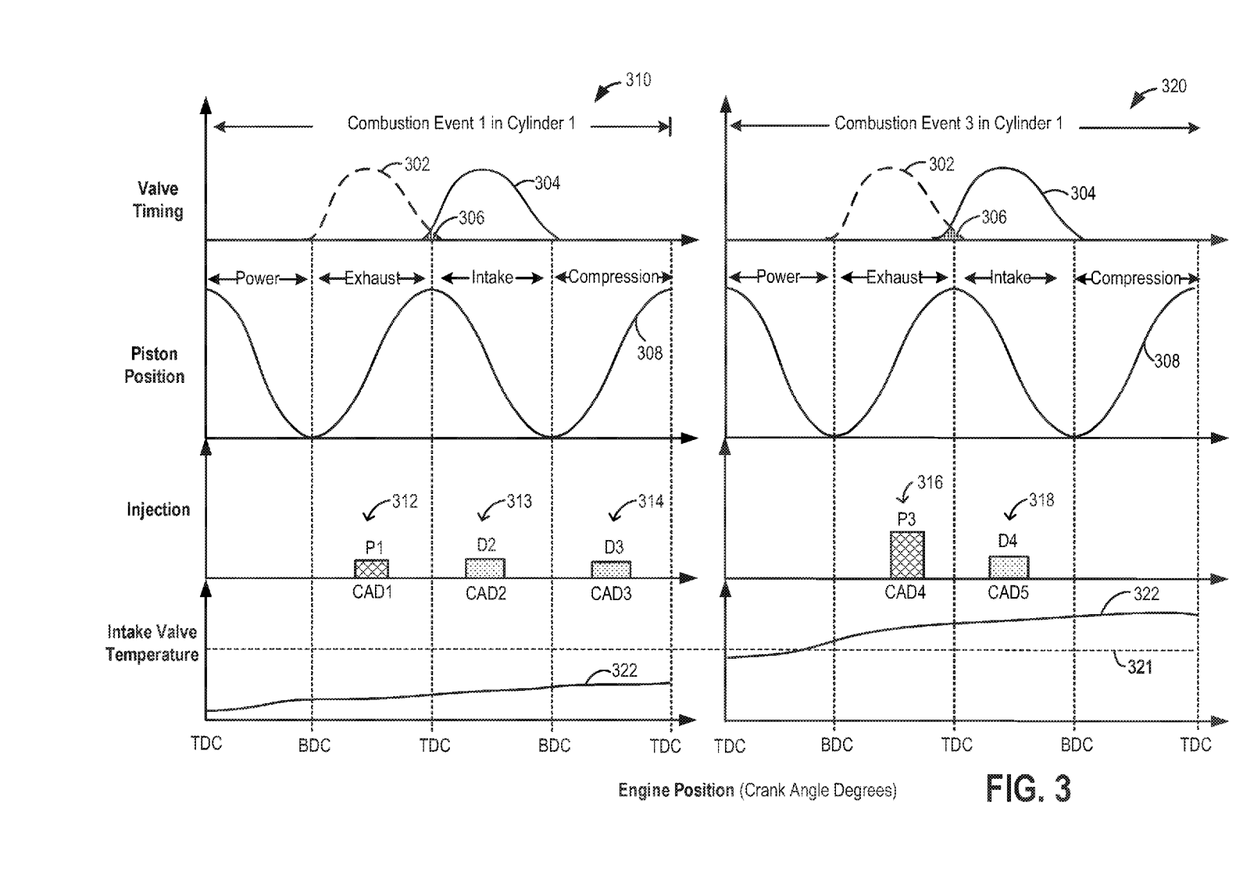
FIG. 3 portrays variation in fuel injection ratio within a given cylinder as a function of intake valve temperature.

FIG. 3 shows maps 310 and 320 depicting valve timing, piston position, and injection profile with respect to an engine position, for one engine cylinder. During an engine start, while the engine is being cranked, an engine controller may be configured to adjust a fuel injection profile of fuel delivered to the cylinder. In particular, fuel may be delivered as a first profile during the engine start, and then transitioned to a second, different profile based on IVT and combustion event number. The fuel injection profiles may include a portion of the fuel delivered to the cylinder as port injection and a remaining portion of the fuel delivered to the cylinder as direct injection. FIG. 3 shows an example injection profile as it varies depending on IVT and combustion event number within the same cylinder. A cold start profile is shown in map 310 whereas map 320 shows an injection profile at a later combustion event as IVT increases above a threshold.

Maps 310 and 320 illustrate an engine position along the x-axis in crank angle degrees (CAD). Curve 308 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 308, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 302 and 304 depict valve timings for an exhaust valve (dashed curve 302) and an intake valve (solid curve 304) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 306 (or simply, positive valve overlap), represented by a hatched region at the intersection of curves 302 and 304. In one example, the positive intake to exhaust valve overlap 306 may be a default cam position of the engine present during an engine cold start.

The third plot (from the top) of map 310 depicts an example fuel injection profile that may be used at an engine cold start, during engine cranking, to reduce an amount of engine start exhaust emissions without degrading engine combustion stability. The third plot (from the top) of map 320 depicts an example fuel injection profile that may be used during an idling phase when the intake valve temperature (plot 322) has surpassed a minimum threshold (line 321) and while the engine is at or above an idling speed. Alternately, the injection profile may be adjusted based on combustion event number since an engine start with a portion of fuel port injected (hatched block) and a portion of fuel direct injected (dotted blocks).

As mentioned earlier, maps 310 and 320 represent different combustion events within the same cylinder, for e.g., cylinder 1 in a 4-cylinder inline engine.

In the example depicted by map 310, a fuel injection profile used during a first combustion event since engine start is depicted. Herein, the engine start is an engine cold start.

An engine controller is configured to provide the total amount of fuel to the cylinder as a first port injection depicted at 312 (hatched block), a second direct injection depicted at 313 (dotted block), and a third direct injection depicted at 314 (dotted block). The first port injection 312 may include a first smaller portion of fuel (P1) that is port injected at a first timing CAD1. In particular, the first portion of fuel is port injected during a closed intake valve event (that is, during the exhaust stroke). Then, a remaining larger portion of the fuel is direct injected over multiple injections (herein two injections). In particular, a second portion of fuel (D2) is direct injected as a first intake stroke injection at CAD2 while a third portion of fuel (D3) is direct injected as a second compression stroke injection at CAD3. In one example, fuel may be delivered at a ratio of 65:35 of direct injected to port injected fuel.

The fraction of fuel being supplied as a port injection and a direct injection may be based upon the intake valve temperature (IVT). The IVT may be inferred at the beginning of a combustion event within a given cylinder and an injection ratio for that combustion event may be selected based on the IVT being higher or lower than a threshold. Specifically, the IVT determines the fraction of port injected fuel in the injection ratio. For example, in map 310, the IVT (plot 322) gradually increases through combustion event number 1 but remains below the threshold (line 321) as the combustion event ends at TDC of the compression stroke. Therefore, the intake valve may not be hot enough to evaporate port injected fuel and the controller may select a smaller proportion of fuel to be port injected. In one example, at cold start, a proportion of port injected fuel being delivered may be 10% while 90% fuel may be direct injected. In another example, fuel may not be injected via the port injector and may be supplied entirely by the direct injector.

In the depicted example of map 310, by port injecting a smaller portion of the fuel and direct injecting a larger portion of the fuel, an exhaust catalyst temperature can be rapidly increased to a light-off temperature without raising exhaust particulate matter emissions and degrading engine combustion stability. This reduces engine start emissions while improving fuel economy.

In the example shown in map 320, a fuel injection profile used during a third combustion event since engine start within the same cylinder (e.g., cylinder 1) is depicted. Herein, the engine is at an engine idling speed and the IVT surpasses the threshold (line 321) during the power stroke of the previous combustion event in the given cylinder. Map 320 being a third cylinder combustion event, an engine controller is configured to provide the total amount of fuel to the cylinder as a first proportion of port injection depicted at 316 (hatched block), and a second proportion of direct injection depicted at 318 (dotted block). An injection event during the compression stroke may be disabled. Port injection 316 may include a first portion of fuel (P3) that is injected at CAD4 during the exhaust stroke. In particular, the first portion of fuel is port injected during a closed intake valve event but later in the exhaust stroke as compared to 312 at CAD1. Specifically, map 320 depicts port injection 316 at a timing more retarded towards intake valve opening relative to port injection 312 in map 310. A remaining smaller portion of the fuel (D4) is direct injected at CAD5 during an open intake valve event (that is, during the intake stroke). In this example, CAD5 in map 320 is the same timing as CAD3 of map 310.

The fraction of fuel being supplied as a port injection and a direct injection may be based upon the intake valve temperature (IVT). For example, in map 320, the IVT (plot 322) is higher than the threshold (line 321) as the exhaust stroke begins. Therefore, the intake valve may be hot enough to evaporate and atomize port injected fuel and the controller may select a larger proportion of fuel to be port injected. Map 320 depicts the proportion of port injected fuel (P3) as a significantly larger amount than the proportion of port injected fuel (P1) in map 310 when IVT is below the threshold. Map 320 also shows P3 as being a slightly larger amount than the direct injected fuel (D4). In one example, after the IVT is higher than the threshold, a proportion of port injected fuel being delivered may be adjusted to 70% while 30% of fuel may be direct injected.

It will be appreciated that the selected injection ratio may be further based upon the heat of vaporization and the vaporization temperature of the fuel. Other parameters may include fuel temperature, intake valve timing, injection timing and the engine speed. The valve temperature may be used to determine the heat capacity of the intake valve while the heat of vaporization and the temperature of the fuel provides the amount of heat that is withdrawn from the valve to evaporate the fuel. The amount of time available to evaporate the fuel may be determined by the amount of time available for each injection from the time it is injected to the time intake valve opens. This is a function of engine speed, injection timing and the intake valve cam timing. Therefore, scheduling of port fuel injection to obtain maximum benefit may be a function of all the parameters listed above.

In the embodiment described herein, an initial injection profile may be primarily scheduled as a function of combustion event number and engine speed for a given fuel type. This profile may be adjusted within each cylinder based on the intake valve temperature of that cylinder. By selecting a fuel injection ratio based on intake valve temperature wherein the fraction of fuel being port injected increases as IVT rises, benefits associated with port fuel injection may be availed. Port injected fuel may evaporate faster and be homogenized in the intake port as the intake valve temperature increases thereby, improving emissions.

Further modifications to the model may be based on other inputs. For example, the injection profile may be modified as a function of percent ethanol contained in the fuel to account for the difference in the heat of vaporization and the vaporization temperature (boiling point) of the fuel.

Figure 4:
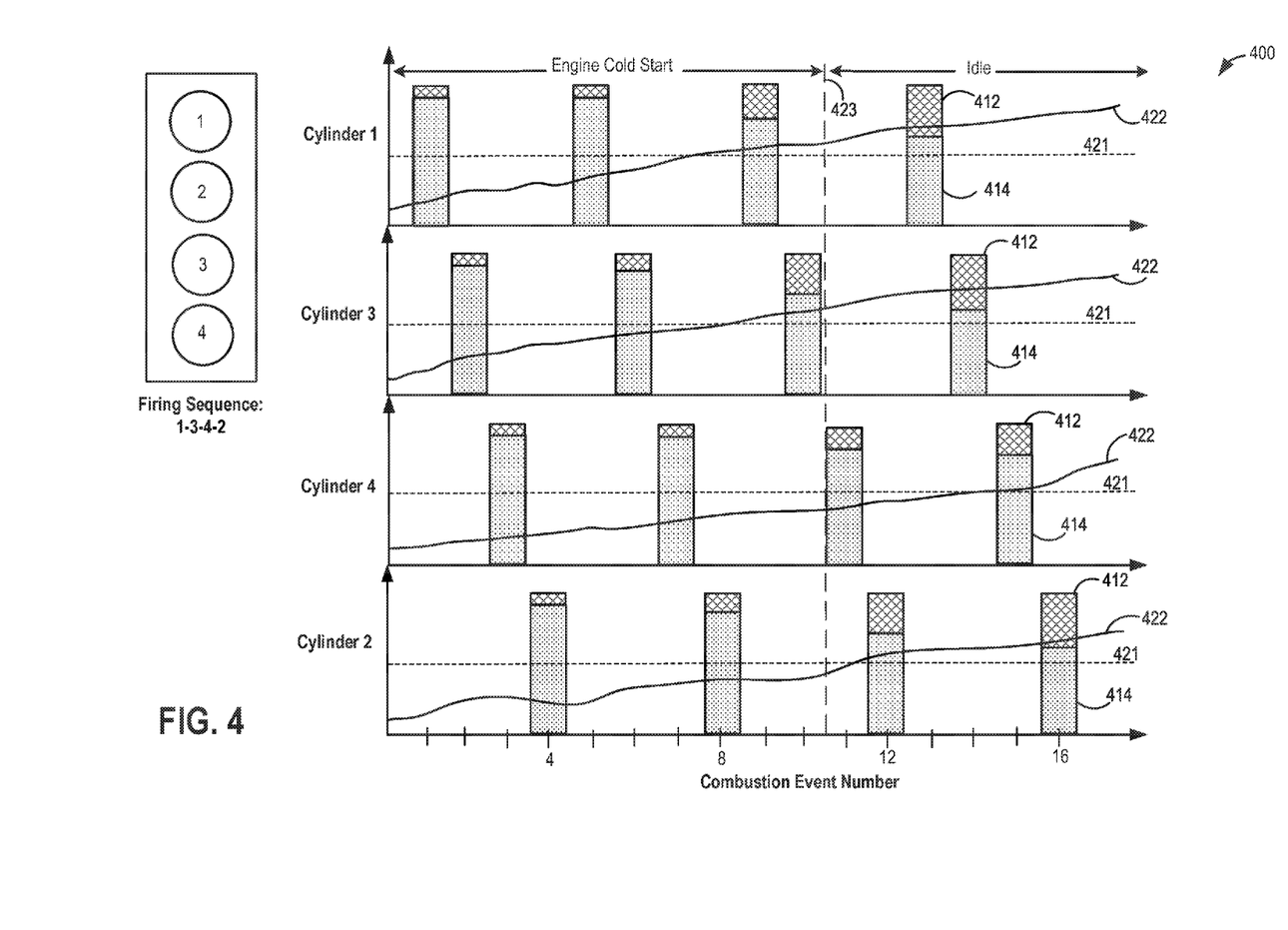
FIG. 4 demonstrates variation in fuel injection ratio in a 4 cylinder engine according to number of combustion events and intake valve temperature in each cylinder.

Now turning to FIG. 4 wherein map 400 depicts an example variation in fuel injection amounts within a 4-cylinder engine as combustion event numbers increase from a cold start. The example portrayed is for a 4-cylinder inline engine with a firing sequence 1-3-4-2.

Map 400 illustrates combustion event number along the x-axis and includes injection ratio plots for each cylinder in the 4-cylinder engine. The top plot is for Cylinder 1 which fires first, the second plot (from top) is for Cylinder 3 which fires second, the third plot (from top) is for Cylinder 4 which fires third, the last plot is for Cylinder 2 which fires fourth following which the cycle repeats. Each injection includes a portion of fuel injected via a port injector (412) and a portion of fuel injected via a direct injector (414). The port injected fuel portion is indicated by a cross hatched block while the direct injected fuel portion is indicated by a dotted block. Plot 422 represents the intake valve temperature (IVT) and line 421 represents a threshold temperature. Line 423 separates the combustion events into a first cold start phase (on left) and a second idle phase (on right).

At an engine cold start, as cylinder 1 undergoes a first cylinder combustion event, the IVT is significantly lower than the threshold (421) and an injection ratio is chosen that includes a smaller portion of port injected fuel and a larger portion of direct injected fuel. Since the IVT in all cylinders for the first 4 combustion events is below the threshold, the initial fuel injection profile for all engine cylinders includes an injection ratio with a higher proportion of fuel delivered via direct injection relative to port injection.

At combustion event number 6, the IVT in cylinder 3 is slightly below the threshold (line 421) and the controller may increase the proportion of port injected fuel by an incremental amount. Specifically, the IVT may be actively monitored and the proportion of port injected fuel may be increased gradually as the IVT approaches the threshold. In another embodiment, the controller may maintain the first injection profile including a fuel injection ratio with a smaller proportion of port injected fuel until IVT in cylinder 3 reaches the threshold. The injection profile may be transitioned to a second profile and an injection ratio with a larger proportion of port injected fuel after the IVT surpasses the threshold.

As such, the IVT for each cylinder may be inferred based on factors such as cylinder load, coolant temperature, and location of the specific cylinder in the engine block. For example, the location of a cylinder may be affected by its firing order and its position relative to coolant loops may determine the amount of heat transfer to/from cylinder. The IVT for cylinder 3 may increase faster than cylinder 4 because cylinder 3 is positioned at the interior of the engine block as compared to the exterior position of cylinder 4. However, even though cylinder 2 is at an interior position within the engine block, its temperature may rise relatively slower because of its position in the firing sequence.

By combustion event number 9 the IVT in cylinder 1 has surpassed the threshold and the controller transitions cylinder 1 to an injection ratio wherein the proportion of port injected fuel is increased relative to the initial cold start profile and a proportion of direct injected fuel is reduced relative to the initial cold start profile. This increase may be proportionate to the difference between the IVT and the threshold. Specifically, the higher the difference between IVT and the threshold, the larger the fraction of port injected fuel. However, the increase in the fraction of port injected fuel may be restricted by its effect on engine performance.

By combustion event number 10 the emissions catalyst may have attained light-off and the engine may now operate at idling speed whereupon the proportion of port injected fuel is increased even if the IVT within a cylinder has not surpassed the threshold. Thus, the proportion of port injected fuel is increased in cylinder 4 at combustion event number 11 even though the IVT in cylinder 4 is lower than the threshold. However, the increase in the amount of port injected fuel responsive to the rise in combustion events may be smaller than a corresponding increase in port injected fuel when the IVT of cylinder 4 exceeds the threshold. Cylinder 2 at combustion event number 12 therefore receives a higher proportion of port injected fuel than cylinder 4 at combustion event number 11 since the IVT within cylinder 2 is higher than the threshold.

Additionally, cylinders 1, 2 and 3 operate with a relatively larger fraction of port injected fuel after combustion event 8 whereas cylinder 4 operates with a relatively smaller fraction of port injected fuel at combustion event 11. This is because the IVT in cylinder 4 is significantly lower than the threshold whereas the IVT within the remaining cylinders has surpassed the threshold.

At combustion event number 13, the injection profile in cylinder 1 is completely transitioned to an idling profile because the IVT is higher than the threshold and the number of combustion events has increased enough for the engine to reach an idling speed. The idling injection profile includes an injection ratio wherein the amount of port injected fuel is significantly higher than the amount delivered via the port injector during a cold start. The injection ratio in cylinder 4 at combustion event number 15 continues to be that of the first, cold start profile even though the engine is operating in an idling phase since the IVT in cylinder 4 is at the threshold. Therefore, cylinders 1, 2 and 3 may operate with a different injection (for e.g., an idling) profile compared with cylinder 4 until the IVT in cylinder 4 surpasses the threshold. Further, cylinder 1 is transitioned to an idling profile earlier than cylinder 4. Specifically, cylinder 1 is transitioned to the idling profile after 12 engine combustion events whereas cylinder 4 may be transitioned much later for e.g., after 18 engine combustion events (not shown in FIG. 4). Fuel injection within cylinders 2 and 3 is transitioned to an idling profile later than cylinder 1 but earlier than cylinder 4. In this way, a first cylinder may be transitioned to an idling injection profile earlier relative to a second cylinder wherein the first cylinder may be transitioned after a first, smaller number of combustion events since engine start, and the second cylinder may be transitioned after a second, larger number of combustion events since engine start.

Figure 5:
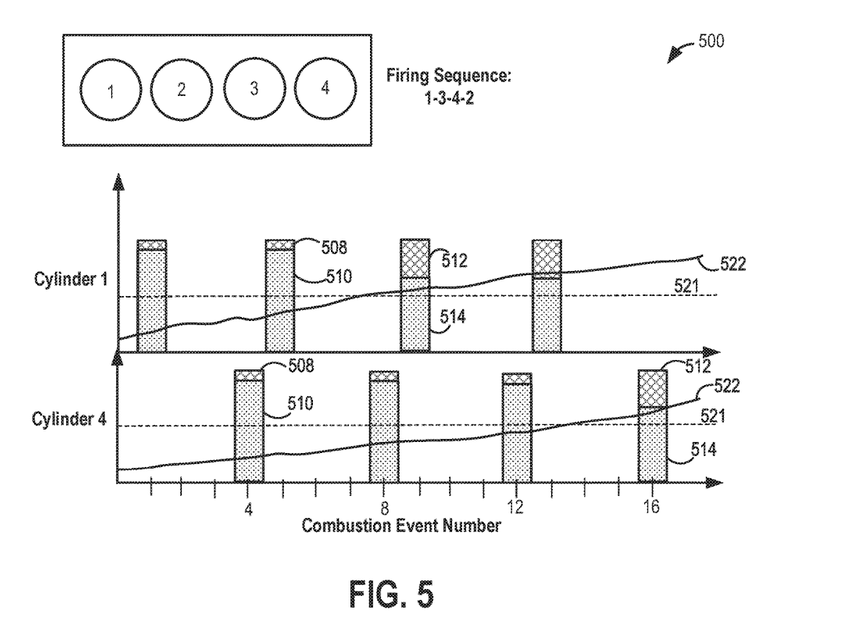
FIG. 5 compares fuel injection ratios in two cylinders of a 4-cylinder engine.
Figure 6:
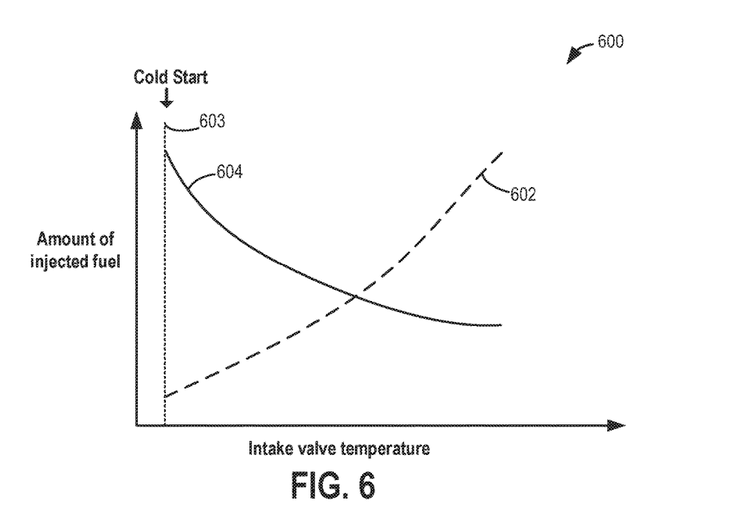
FIG. 6 shows the relationship between intake valve temperature and fuel amounts injected via direct injection and port injection.

Referring now to FIG. 5 wherein map 500 is shown depicting a different embodiment of injection ratio variations within two distinct cylinders as combustion event numbers increase. Map 500 portrays an example variation within two cylinders of a 4-cylinder inline engine with a firing sequence 1-3-4-2.

Map 500 shows combustion event number along the x-axis and includes injection ratio plots for a cylinder on the y-axis. The top plot represents cylinder 1 which fires first and the second plot (from top) represents cylinder 4 which fires third in the sequence. A first injection ratio is represented by blocks 508 and 510, and a second injection ratio is represented by blocks 512 and 514. Each injection includes a portion of fuel injected via a port injector (cross hatched block) and a portion of fuel injected via a direct injector (dotted block). Plot 522 represents the intake valve temperature (IVT) and line 521 represents a minimum threshold temperature.

In the example shown in FIG. 5, the controller uses two predefined injection profiles for a given alcohol content in a fuel: a first injection profile for a cold start condition and a second profile for when the IVT within a cylinder is higher than the threshold. The first injection profile includes an injection ratio wherein the fraction of port injected fuel is lower and the second injection profile comprises a higher fraction of port injected fuel.

Cylinders 1 and 4 are operated with a first injection profile (508 & 510) until combustion event number 9 when the IVT within cylinder 1 exceeds the threshold (line 521). The injection ratio within cylinder 1 is then transitioned to the second profile (512 & 514) with a larger proportion of port injected fuel. However, cylinder 4 continues to be operated with the first injection profile with a smaller ratio of port injected fuel until combustion event 16 when its IVT rises above the threshold. Therefore, at and after combustion event 16, both cylinders 1 and 4 are operated with the second injection profile.

In the embodiment described above, the fuel injection ratio remains the same until the IVT surpasses the threshold. In other embodiments described in reference to FIGS. 2, 3 and 4, the injection ratio may change gradually as the combustion event numbers increase and the IVT approaches the threshold. Specifically, the proportion of port injected fuel may increase from a first smaller fraction used at cold start as the number of combustion events since engine start increase until the IVT threshold is reached.

In further representations, an engine controller may adjust a ratio of a first fuel delivered to a cylinder via direct injection relative to a second fuel delivered to the cylinder via port injection based on a temperature of an intake valve of the cylinder and further based on an alcohol content of the port injected fuel. For example, as the intake valve temperature of the cylinder increases, an amount of second fuel that is port injected may be increased while an amount of first fuel that is direct injected may be decreased while maintaining engine torque output. In another example, as the alcohol content of the port injected fuel increases, a proportion of fuel that is direct injected may be increased. The proportion of the port injected fuel may then be increased as the intake valve temperature of the given cylinder increases. In still another representation, during an engine cold-start, a cylinder may be fueled via only direct injection for a first number of combustion events. Then, once the intake valve temperature is sufficiently high, the cylinder may be fueled via at least port injection (with the same fuel or a different fuel) for a second number of combustion events.

In this way, an engine comprising a dual fuel injector system with port and direct injectors can be operated to benefit from fuel fraction scheduling. A controller may schedule an amount of fuel delivered by a port injector for each cylinder based on intake valve temperature within that cylinder, engine speed and fuel alcohol content. By adjusting the fraction of port injected fuel based on intake valve temperature, improvements in emissions and fuel economy may be derived. Selecting a smaller fraction of port injected fuel during cold starts when the intake valve temperature is below a threshold can reduce particulate matter emissions. Additionally, puddling and wastage of fuel in the intake port may be reduced. By increasing the proportion of port injected fuel when intake valve temperature increases, fuel economy may be enhanced because fuel sprayed into the intake port is evaporated and homogenized efficiently. Overall, an improvement in engine performance may be achieved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during a hot engine restart, adjusting a ratio of fuel delivered to a cylinder via direct injection relative to a ratio of fuel delivered to the cylinder via port injection based on a temperature of an intake valve of the cylinder and based on a combustion event number since engine start; and
during a cold engine start, adjusting the ratio of fuel delivered to the cylinder via direct injection relative to the ratio of fuel delivered to the cylinder via port injection based on catalyst temperature.

2. The method of claim 1, wherein the adjusting includes increasing the ratio of fuel delivered to the cylinder via port injection while correspondingly decreasing the ratio of fuel delivered via direct injection as the intake valve temperature of the cylinder increases.

3. The method of claim 2, wherein the adjusting is performed on a cylinder-by-cylinder basis for each engine cylinder based on the intake valve temperature of the given engine cylinder.

4. The method of claim 3, wherein the intake valve temperature of the given engine cylinder is inferred based on one or more of a cylinder load, coolant temperature, and a location of the given engine cylinder on an engine block.

5. The method of claim 3, further comprising adjusting a timing of port injecting fuel into the cylinder based on the intake valve temperature of the cylinder.

6. The method of claim 5, wherein adjusting the timing includes advancing the timing towards intake valve opening as the intake valve temperature increases.

7. The method of claim 1, wherein the ratio of fuel delivered to the cylinder via direct injection relative to the ratio of fuel delivered to the cylinder via port injection is further adjusted based on an alcohol content of the injected fuel, the ratio of fuel delivered via port injection decreased relative to the ratio of fuel delivered to the cylinder via direct injection as the alcohol content of the injected fuel increases, wherein the intake valve is a cam-driven valve closing an opening to a cylinder piston, the intake valve moveably mounted in a cylinder head, the intake valve temperature estimated based on operating conditions including coolant temperature, cylinder head temperature, and oil temperature.

8. The method of claim 7, wherein a first fuel is delivered to the cylinder via port injection and a second fuel is delivered to the cylinder via direct injection, and wherein adjusting the ratio of fuel delivered to the cylinder via port injection relative to the ratio of fuel delivered to the cylinder via direct injection is based on the alcohol content of the injected fuel, the adjusting based on an alcohol content of the port injected first fuel.

9. The method of claim 1, wherein the adjusting is further based on engine speed, the ratio of fuel delivered via port injection decreased as the engine speed increases.

10. An engine system, comprising:
an engine including a cylinder;
a first port injector coupled to the cylinder;
a second direct injector coupled to the cylinder; and
a control system with computer readable instructions for,
generating an initial fuel injection profile for the cylinder based on engine speed and a combustion event number; and
selectively modifying the initial fuel injection profile during a combustion event in the cylinder based on an intake valve temperature of the cylinder, wherein the initial fuel injection profile includes a first proportion of fuel delivered via the second direct injector and a second proportion of fuel delivered via the first port injector, and wherein selectively modifying the initial fuel injection profile during the combustion event in the cylinder includes increasing the second proportion of fuel while correspondingly decreasing the first proportion of fuel as the intake valve temperature of the cylinder increases.

11. The system of claim 10, wherein the initial fuel injection profile further includes a timing of port injection that is during a closed intake valve event, and wherein selectively modifying the initial fuel injection profile further includes retarding the timing of port fuel injection towards intake valve opening.

12. A method for an engine, comprising:
adjusting a ratio of fuel delivered to a cylinder via direct injection relative to a ratio of fuel delivered to the cylinder via port injection based on a temperature of an intake valve of the cylinder, wherein the ratio of fuel delivered to the cylinder via direct injection relative to the ratio of fuel delivered to the cylinder via port injection is further adjusted based on an alcohol content of the injected fuel, the ratio of fuel delivered to the cylinder via port injection decreased relative to the ratio of fuel delivered to the cylinder via direct injection as the alcohol content of the injected fuel increases, wherein the intake valve is a cam-driven valve closing an opening to a cylinder piston, the intake valve moveably mounted in a cylinder head, the intake valve temperature estimated based on operating conditions including coolant temperature, cylinder head temperature, and oil temperature.

13. The method of claim 12, wherein a first fuel is delivered to the cylinder via port injection and a second fuel is delivered to the cylinder via direct injection, and wherein adjusting the ratio of fuel delivered to the cylinder via port injection relative to the ratio of fuel delivered to the cylinder via direct injection is based on the alcohol content of the injected fuel, the adjusting based on an alcohol content of the port injected first fuel.

\* \* \* \* \*